United States Patent [19]

Park

[11] 4,215,202

[45] Jul. 29, 1980

[54] SOFT ETHYLENIC POLYMER BLEND FOAMS

[75] Inventor: Chung P. Park, Pickerington, Ohio

[73] Assignee: The Dow Chemical Company, Midland, Mich.

[21] Appl. No.: 14,019

[22] Filed: Feb. 22, 1979

[51] Int. Cl.$^2$ .............................................. C08J 9/14
[52] U.S. Cl. ..................................... 521/81; 264/51; 264/53; 264/DIG. 5; 521/98; 521/134; 521/910; 535/207; 525/221
[58] Field of Search .................... 521/98, 134, 81; 525/207, 222

[56] References Cited

U.S. PATENT DOCUMENTS

| | | | |
|---|---|---|---|
| 3,766,099 | 10/1973 | Kawai et al. | 521/98 |
| 3,960,792 | 6/1976 | Nakomura | 521/98 |
| 4,091,136 | 5/1978 | O'Brien et al. | 521/81 |
| 4,101,467 | 7/1978 | Park et al. | 521/134 |
| 4,102,829 | 7/1978 | Watanabe et al. | 521/134 |
| 4,110,269 | 8/1978 | Ehrenfreund | 521/134 |
| 4,129,530 | 12/1978 | Park et al. | 521/134 |

Primary Examiner—Morton Foelak
Attorney, Agent, or Firm—Tai-Sam Choo

[57] ABSTRACT

Low density, closed cell, soft foam products having dimensional stability are made from ethylenic resin blends having low stiffness by extrusion foaming, wherein the heat plastified gel comprises the ethylene polymer blend and at least one volatile blowing agent. The blends especially comprise a copolymer of ethylene and monoethylenically unsaturated carboxylic acid and a copolymer of ethylene and at least one monoethylenically unsaturated non-ionic comonomer. The starting ethylenic resin blends are preferably blends of ethylene acrylic acid copolymers and ethylene vinyl acetate copolymers, having stiffness less than about 20,000 psi. Exemplary volatile blowing agents are 1,2-dichlorotetrafluoroethane, 1-chloro-1,2,2,2-tetrafluoroethane and 2,2-difluoropropane.

18 Claims, No Drawings

SOFT ETHYLENIC POLYMER BLEND FOAMS

BACKGROUND OF THE INVENTION

This invention relates to soft ethylenic polymer blend foams made from blends of copolymers of ethylene having relatively low modulus, i.e., materials lacking stiffness and which are limp, flexible and easily stretched. It particularly pertains to improvement in process whereby are obtained such soft foams having substantially closed-cell structure and a good dimensional stability.

The term "stiffness" as used herein means the property of plastics as determined by the test procedure described in ASTM D-747, expressed in pounds per square inch (psi).

It is well known to make closed-cell ethylenic polymer resin foams by the process of extrusion foaming wherein a normally solid thermoplastic ethylenic polymer resin such as polyethylene is heat-plastified and mixed under pressure with a volatile material such as 1,2-dichlorotetrafluoroethane to form a flowable gel which is then passed through a shaping orifice or die opening into a zone of lower pressure. Upon the release of pressure, the volatile constituent of the gel vaporizes, forming a gas phase cellular structure in the gel which cools to a corresponding cellular foamed solid resin. Desirably, the resulting gas cells are substantially uniform in size, uniformly distributed through the foam body, and closed, i.e., separated from each other by membrane walls of resin. Although a number of general principles are thought to be understood, much of the extrusion foaming technology is empirical, based on experience, and directed to very specific materials and details to produce saleable products of narrowly defined specification.

One of the common requirements of acceptable foam resin products is dimensional stability, i.e., it is desired that the linear dimensions and thus the volume of a piece of foam resin not change appreciably, either to shrink or to expand, under ordinary conditions, from the time its manufacture is complete until the time its ultimate useful life is ended. It is also desired that if any appreciable shrinking of a foam is to occur, which is usually the case with a freshly extruded foam, the foam be able to recover within a reasonable period of time to a substantially constant volume close to that of the foam measured shortly after its extrusion. The difficulties of attaining dimensional stability are particularly acute in foams of relatively low density (high expansion ratio) when the resin membrane cell walls are relatively thin. It has been explained that the vapors of volatile material originally present in the cell gradually permeate the cell wall and escape from the foam over a period of time, thereby tending to reduce the inner cell pressure and tending to cause the foam to shrink during that time. However, when the foam is exposed to ambient atmosphere, air and its constituent gases also tend to permeate into the foam through the cell wall over a period of time thereby tending to increase the inner cell pressure. Accordingly, the actual change in cell gas pressure and size is the result of complex and often opposite forces, and the resultant effect on resin foam dimensions is difficult to predict.

Although many volatile hydrocarbons, chlorohydrocarbons, fluorocarbons, and chlorofluorocarbons, as well as volatile ethers, ketones and other materials have been suggested for making extrusion foamed resin products, most are unsatisfactory in one or more respects when used individually. It has been suggested to use mixtures of two or more of such agents, or mixtures thereof with materials not useable alone, in attempt to compensate the inferior properties of each component with the superior properties of one or more other components, thereby to design a better foaming agent. In U.S. Pat. No. 3,766,099, for example, polyethylene is foamed by extrusion of a flowable gel containing a mixture of (A) dichlorodifluoromethane and (B) at least one of monochloropentafluoroethane and octafluorocyclobutane in certain proportions of (B) to (A) and optionally (C) one or more of certain aliphatic hydrocarbons and chlorofluorohydrocarbons. Under certain conditions, the gel is said to produce relatively stable foam products from polyethylene, whereas dichlorodifluoromethane alone produced foams showing considerable shrinkage on storage in air after production. However, the idea of using mixtures of volatile materials as blowing agents introduces even more complexity into the consideration of foaming behavior and makes prediction of results even more difficult.

These difficulties are even greater where, in place of polyethylene, there is used an ethylenic polymer resin having less stiffness, i.e., lower flexural modulus, than polyethylene, e.g., copolymers of ethylene and vinyl acetate (EVA) having stiffness (ASTM D-747) less than 20,000 psi. When such soft copolymers are used, the resulting foam is very sensitive to imbalances of rates of diffusion of the residual blowing agent out of the resin and out of the cells and air into such cells so that the tendency for dimensional instability, e.g., shrinking, is even greater than for stiffer resins and foams. For example, although U.S. Pat. No. 3,766,099 says that its process and mixed blowing agents can be used for foaming EVA resins in place of polyethylene, the fact is that, when the system preferred for use with polyethylene is used with a soft, low-stiffness EVA resin, the resulting foam is dimensionally unstable and shrinks excessively on exposure to air, and there is no direction or instruction in the patent to correct the situation and to provide a satisfactory product.

In U.S. Pat. No. 4,101,467 low density closed-cell, soft foam products having dimensional stability are made from ethylenic resins having low stiffness, especially from copolymers consisting essentially of ethylene and monoethylenically unsaturated non-ionic comonomers by the process of extrusion foaming. The process is particularly characterized in that the volatile blowing agent is composed of at least two essential constituents having certain physical characteristics. Exemplary mixtures contain (I) 1,2-dichloro-1,1,2,2-tetrafluoroethane and (II) from 25 to 50 percent chloropentafluoroethane, octafluoropropane or octafluorocyclobutane based on the mixtures of (I) and (II). In U.S. Pat. No. 4,129,530, similar soft foam products are made using an exemplary mixture containing (I) dichlorodifluoromethane and (II) from 35 to 50 percent chloropentafluoroethane, octafluoropropane or octafluorocyclobutane based on the mixtures of (I) and (II). However, using mixtures of volatile materials as blowing agents introduces more complexity into the extrusion foaming process with related process difficulties. Furthermore, there is need and desire for improved and/or alternate processes which are less difficult to carry out. It is also desirable to have such soft foam products having improved physical properties, especially for use in constructing items of wearing apparel, particularly for cushioning in sports equipment and athletic padding and for flotation in vests for water skiers, boating safety jackets and the like.

U.S. Pat. No. 4,102,829 discloses a thermoplastic foam characterized by low density, high thermal resistance, good adhesion properties and uniform cell size which comprises a mixture containing from 35 percent to 95 percent ionomer characterized by the presence of a monomer unit based on an unsaturated carboxylic acid and 5 percent to 65 percent polyolefin polymer or copolymer, based on the total weight of resin; the ethylene monomer unit and unsaturated carboxylic acid ester monomer unit values of the ionomer being from 50 to 97 mol percent and up to 30 mol percent, respectively, the neutrality value of the ionomer being up to 50 percent, the saponification value of the ionomer being at least 50 percent, and the melt index of the ionomer being from 0.1 to 50 g/10 min.; the melt index of the polyolefin being from 0.1 to 30 g/10 min. However, such patent does not contemplate low density, closed-cell, soft foam products being dimensionally stable from a polymer blend comprising a copolymer of ethylene and carboxylic acid and a copolymer of ethylene and at least one monoethylenically unsaturated non-ionic comonomer.

U.S. Pat. No. 4,110,269 discloses a method of producing a low density polyethylene foam comprising charging an extruder with a polyethylene resin, from about 5 percent to 30 percent by weight of an ionomer resin selected from the group consisting of ionically cross-linked copolymers of ethylene/methacrylic acid and ethylene/vinyl acetate, and a nucleating agent, heating said charge so as to melt said resins, injecting an expanding agent mixture consisting of dichlorodifluoromethane and dichlorotetrafluoroethane into said melt charge in an amount of 8 percent or less by weight and said mixture comprises approximately a 2:1 ratio of dichlorotetrafluoroethane to dichlorodifluorourethane and extruding said melt charge to form said foam. This reference not only does not contemplate the present invention but also uses mixtures of volatile materials as blowing agents with attendant process difficulties as discussed hereinabove.

An object of this invention is to provide improved soft, flexible foams of polymer resin blends. Another object is to provide a method and a means for making such foams. A particular object is to provide such improved method and a means for making soft, flexible, substantially closed-cell, low density polymer resin blend foams from blends of ethylenic polymer resins which have low stiffness. Other objects and advantages of the invention are brought out in the description that follows.

SUMMARY OF THE INVENTION

The objects of this invention are attained in soft ethylenic polymer resin blend foams having substantially closed cell structure, dimensional stability, and flexural modulus less than about 150 psi, preferably less than about 100 psi, and an improved method and a means for making the same from ethylenic polymer resin blends having low stiffness less than about 20,000 psi, usually from about 1,000 to about 10,000 psi, using gel-foaming technology. The ethylenic polymer resin blend comprises from about 40 to about 90 percent by weight of a copolymer of ethylene and monoethylenically unsaturated carboxylic acid having from about 3 to about 15 percent by weight of carboxylic acid in admixture with from about 10 to about 60 percent by weight of a copolymer consisting essentially of ethylene and at least one monoethylenically unsaturated non-ionic comonomer having from about 5 to about 45 percent by weight of non-ionic comonomer.

In accordance with this invention, blowing agent comprises at least one fluorocarbon from group I. The term fluorocarbon is used herein to mean halocarbons containing carbon and fluorine atoms, any other atoms being limited to hydrogen or chlorine atoms. The symbol "FC" hereinafter stands for "fluorocarbon" and numbers are chosen for convenience in referring to these fluorocarbon compounds.

The group I fluorocarbons are required to have two to four carbon atoms in their molecular structure, normal boiling points, i.e., under standard one atmosphere pressure, between $-30°$ C. and $30°$ C. and a value for the critical quantity $T_b - 0.5V_c$ of between 110 to 145 where $T_b$ is the normal boiling point temperature of the fluorocarbon in degrees Kelvin and $V_c$ is its critical mole volume in cubic centimeters per gram-mole. [The critical volume of a substance can be experimentally measured, and the values of many are reported in the literature. It can also be computed as the reciprocal of the critical density, converted to gram-mole basis. Approximate values of critical volume can also be calculated from the molecular structure according to the Lydersen equation as described in "Chemical Process Principles" by Olaf A. Hougen, K. M. Watson and R. A. Ragatz, 2nd Edition, published (1954) by John Wiley & Sons, New York, page 88 and Table 6, page 91. The Lydersen equation is $V_c = 40 + \Sigma \Delta \nu$ where $V_c$ is the critical volume in cubic centimeters per gram-mole and $\Sigma \Delta \nu$ is the summation of the contributions for each atom or atomic group that is present, using values set out in Table 6 on page 91 of the publication.] Specific examples of such group I fluorocarbons are 1,2-dichlorotetrafluoroethane (FC-114), 1-chloro-1,2,2,2-tetrafluoroethane (FC-124A), 1-chloro-1,1,2,2-tetrafluoroethane (FC-124) and 1,1,1-trifluoropropane (FC-263). Each of these fluorocarbons has a normal boiling point temperature between $-30°$ to $30°$ C. and a value for $T_b - 0.5V_c$ between 110-145. There can be up to about 0.35 gram-mole of such blowing agent per 100 grams of resin blend in the flowable gel. The resulting copolymer blend foams have densities from about 1.0 to about 6 pounds per cubic foot (pcf) and are preferably low density foams having densities from about 1.0 to about 3 pcf.

Optionally, up to about 25 parts by weight of the fluorocarbons of group I can be replaced by at least one volatile blowing agent selected from group II, provided that the resultant foam articles are dimensionally stable as defined hereinbelow. The group II consists of sub-group A of dichlorodifluoromethane (FC-12), sub-group B of fluorocarbons having one to four carbon atoms in their molecular structure, normal boiling point temperature between $-50°$ to $50°$ C. and a value for the critical quantity $T_b - 0.5V_c$ of between 146-190, and sub-group C of hydrocarbons having three to five carbon atoms in their molecular structure. Specific examples of such sub-group B fluorocarbons are trichlorofluoromethane (FC-11), 1-chloro-1,1-difluoroethane (FC-142B), 1,1-difluoroethane (FC-152A) and 2,2-difluoropropane (FC-272). Specific examples of such sub-group C hydrocarbons are propane, isobutane and neopentane.

DETAILED DESCRIPTION AND EMBODIMENTS

The soft ethylenic polymer resin blends for use in making soft foams according to this invention are prepared from normally solid polymers of ethylene having low stiffness up to about 20,000 psi, preferably from about 1,000 to about 10,000 psi, as determined by ASTM D-747. Such polymers have lower stiffness than do homopolymers of ethylene, the stiffness of which normally runs from about 20,000 to about 60,000 psi or more, depending primarily on density and crystallinity. A first group of low-stiffness polymers in the blends are copolymers which consist essentially of ethylene and at least one monoethylenically unsaturated non-ionic comonomer, especially another olefin or a carboxylic acid or an alkyl ester of a monoethylenically unsaturated carboxylic acid. The term "non-ionic" is meant to exclude comonomers which have free acid groups or their salts. A second group of low-stiffness polymers are copolymers which consist essentially of ethylene and monoethylenically unsaturated carboxylic acids, especially acrylic and methacrylic acids.

Typical soft ethylenic polymers of the first group for use in accordance with this invention are low-stiffness copolymers of ethylene with one or more non-ionic comonomers copolymerizable therewith such as propylene, butene-1 and other olefins, especially $\alpha$-olefins, vinyl esters such as vinyl acetate, vinyl propionate and like vinyl esters of monocarboxylic acids, and esters of monoethylenic carboxylic acids such as methyl acrylate, ethyl acrylate, propyl acrylate and methacrylate, the several butyl and isobutyl acrylates and methacrylates, 2-ethylhexyl acrylate, dimethyl maleate, and like monoethylenic carboxylic acid esters, and mixtures of such non-ionic comonomers copolymerizable with ethylene. Typical such soft copolymers have a major proportion of ethylene copolymerized therein with a minor proportion of one or more copolymerizable comonomers selected to provide the desired low stiffness. For example, suitable ethylene copolymers comprise from about 5, preferably from about 10, to about 45 weight percent vinyl acetate. In addition to the non-ionic comonomer or comonomers in the copolymer with ethylene, the copolymer may optionally contain a small amount of one or more ionic comonomers, preferably not more than an amount corresponding to one-half of the amount of non-ionic comonomer in the copolymer and not more than about 5 weight percent of the copolymer. By "ionic" is meant comonomers which contain free carboxylic acid groups or other acid groups or the salts thereof such as acrylic acid, methacrylic acid and their sodium, lithium and like salts.

Typical polymers of the second group for use in accordance with this invention are normally solid thermoplastic polymers of ethylene modified by monomers having reactive carboxylic acid groups, particularly copolymers of a major proportion of ethylene and a minor proportion, typically from 3 to 15, preferably from 5 to 12, percent by weight, of an ethylenically unsaturated carboxylic acid. Specific examples of such suitable ethylenically unsaturated carboxylic acids (which term includes mono- and polybasic acids, acid anhydrides, and partial esters of polybasic acids) are acrylic acid, methacrylic acid, crotonic acid, furamic acid, maleic acid, itaconic acid, maleic anhydride, monomethyl maleate, monoethyl maleate, monomethyl fumarate, monoethyl fumarate, tripropylene glycol monomethyl ether acid maleate, or ethylene glycol monophenyl ether acid maleate. The carboxylic acid monomer is preferably selected from $\alpha,\beta$-ethylenically unsaturated mono- and polycarboxylic acids and acid anhydrides having from 3 to 8 carbon atoms per molecule and partial esters of such polycarboxylic acid wherein the acid moiety has at least one carboxylic acid group and the alcohol moiety has from 1 to 20 carbon atoms. The copolymer may consist essentially of ethylene and one or more of such ethylenically unsaturated acid comonomers or can also contain small amounts of other monomers copolymerizable with ethylene. Thus, the copolymer can contain other copolymerizable monomers including an ester of acrylic acid. The comonomers can be combined in the copolymer in any way, e.g., as random copolymers, as block or sequential copolymers, or as graft copolymers. Materials of these kinds and methods of making them are readily known in the art.

The starting resin blends can also contain small portions of polymers which in themselves are too stiff to be used as such, provided that such blends also contain sufficient low-stiffness copolymers so that the resulting blends have the required stiffness.

A particular advantage of this invention is that a single blowing agent selected from group I fluorocarbons as described hereinabove, such as 1,2-dichlorotetrafluoroethane (FC-114), can be used to make soft ethylenic foams; although use of a single blowing agent is preferred, mixtures of two or more of such fluorocarbons may also be used as blowing agents.

By itself, FC-114 is described in U.S. Pat. No. 3,067,147 as particularly suitable for making low density extruded foam from polyethylene. According to that patent, copolymers of ethylene, including those with vinyl acetate, can similarly be formed with FC-114. However, as shown in U.S. Pat. No. 4,101,467, foams made from low-stiffness copolymers of ethylene and vinyl acetate using FC-114 alone as blowing agent are not entirely satisfactory in regard to dimensional stability. Accordingly, that application teaches the use of mixtures of two or more volatile materials as blowing agent. Soft ethylenic polymer resin blends of this invention allows use of a single volatile material as blowing agent.

The ethylenic polymer resin blends of the present invention can be prepared by admixing from about 40 to about 90 percent by weight, preferably from about 60 to about 90 percent by weight of a copolymer of ethylene and monoethylenically unsaturated carboxylic acid having from about 3 to about 15 percent by weight, preferably from about 5 to about 12 percent by weight of carboxylic acid and from about 10 to about 60 percent by weight, preferably from about 20 to about 40 percent by weight of a copolymer consisting essentially of ethylene and at least one monoethylenically unsaturated non-ionic comonomer having from about 5 to about 45 percent by weight, preferably from about 10 to about 45 percent by weight, most preferably from about 15 to about 30 percent by weight, of non-ionic comonomer. These copolymers can be blended together in a variety of different ways, and the manner of blending is not critical as long as the two copolymers are thoroughly mixed together.

The blowing agent is compounded into the starting low-stiffness olymer resin blend in proportions to make the desired degree of expansion in the resulting foamed cellular product, usually up to about 60-fold volume expansion to make products having aged foam densities down to about 0.016 g/cc (about 1.0 pound per cubic foot). Depending on the starting proportion of blowing agent, the resulting foam products of this invention have densities from about 1.0 to about 6 pounds per cubic foot (pcf), those having densities from about 1.0 to about 3 pcf being called "low density" foams herein. The maximum useful proportion of such blowing agent in composition of flowable, foamable gel is in the order of about 0.35 gram-mole per 100 grams of the starting resin. The maximum useful proportion of blowing agent in the foamable gel is also affected by the pressure which is maintained on the gel in the extrusion die passage, being greater when the die pressure is relatively higher under conditions such as when the die orifice is relatively smaller and/or the through-put rate is relatively greater.

The blowing agent is compounded into the starting resin blend in conventional fashion to make a flowable gel, preferably in continuous manner, e.g., in a mixing extruder, using heat to plastify the resin blend, pressure to maintain the blowing agent in non-gaseous state, and mechanical working to obtain a thorough mixing of the resin blend and blowing agent. The resulting gel is then cooled if necessary and passed through a suitable die orifice into a zone of lower pressure, e.g., normal ambient air temperature, where it expands to a lower density, cellular mass. As the foamed extrusion forms, it is taken away from the extruder, allowed to cool to harden the resin blend, and collected for further processing, storage or other disposal.

The resulting ethylenic polymer blend foam is comprised of substantially closed-cell structure and is very soft in compression, limp and flexible to bending and shaping, and is pleasing to the touch. Surprisingly, it is found that the foamed product is remarkably stable in dimensions on exposure to ambient atmospheric air, even at low foam density.

For the present purposes, dimensional stability of the foam refers to changes which occur in foam volume, particularly in later stages of manufacture and during subsequent storage of the foam product.

As the foamable gel emerges from the extruder die orifice in the foam extrusion process, foaming begins, and the gel foam volume increases with expansion of the gas constituent forming many closed cells in the resin matrix. The evaporation of blowing agent from liquid gel phase to gas phase and exposure of the gel to ambient atmosphere causes cooling of the foam so that the expanding gel/resin foam quickly reaches a maximum volume and then begins to shrink. This first shrinkage stage is primarily caused by the effect of falling temperature on the foam cell volume but is complicated by the relatively greater diffusion of gases out of rather than into the cell space. The thermal shrinkage of the foam would stop when the foam resin hardens and the foam temperature reaches ambient atmosphere temperature, if no other factors were present. Usually, the foam continues to shrink at ambient temperature during the period when the net rate of diffusion of gases out of the foam cells is greater than the rate of diffusion of air into such cells. As indicated, in soft foams of low stiffness copolymer blends, this loss of gas from the foam cell is manifested by decreased volume of the cells and shrinkage of the foam, whereas in a foam of more rigid material the gas loss would result in lower cell gas pressure with little or no shrinkage of the foam volume overall.

In soft foams, any shrinkage as described continues until the cell gas composition changes sufficiently to balance the gas diffusion out of and into the cells. Having reached a minimum, the foam volume then usually begins to expand again as air continues to diffuse into the cell space from which residual gas from the blowing agent is diffusing at even lower rate. This re-expansion of the soft foam from minimum volume continues until the cells are again inflated and the foam attains substantially constant volume.

For the present purposes, the dimensional stability of the extrusion foam products is measured by observing the changes in volume occurring in test specimens of the foam as a function of time. The test specimens are obtained by quickly cutting, from the extrusion foam product soon, e.g., within about fifteen minutes, after emerging from the extrusion die orifice, pieces of varying thickness approximately 5.5 inches wide by 7.5 inches long and accurately measuring their overall volume, e.g., by cubic displacement of water. The initial volume of each specimen is arbitrarily selected as the bench mark volume for the subsequent dimensional stability study. The individual foam specimen is exposed to air at atmospheric pressure and ordinary room temperature; its volume is re-measured from time-to-time and related on a volume percentage basis to the initial volume. From the resulting data observations are made particularly as to:

(1) the minimum volume to which the specimen is reduced by shrinking as percent of initial volume;
(2) the time required to reach such minimum volume of (1);
(3) the steady state volume to which the specimen subsequently re-expands or recovers, as percent of initial volume; and
(4) the time required to reach such steady state recovered volume of (3).

In general, the preferred products have little shrinkage in (1) and recover their initial volume (3) in a short time (4). In practical terms, substantially complete recovery (3) and attainment of constant volume in relatively short time (4) are probably more important than the degree of shrinking in (1), although systems that show little early shrinkage often also show prompt and complete recovery to constant volume.

In the instant invention, a soft extruded foam is considered to be dimensionally stable for practical purposes if the volume of the foam, following the initial shrinking thereof, recovers to a substantially constant volume of about 90, preferably 95, percent of the foam volume measured shortly, e.g., within about 15 minutes, after extrusion from the die orifice, within about 4, preferably about 2, weeks after its extrusion. The term "dimensionally stable" in reference to the subject soft ethylenic polymer foams is used herein in the sense of the foregoing definitive description.

The specific working examples that follow are intended to illustrate the invention but are not to be taken as limiting its scope. In the examples, parts and percentages are by weight unless otherwise specified or required by the context.

EXAMPLE 1

Ethylenic polymer blend foams are made by continuous extrusion from a conventional screw-type extruder. The extruder comprises the usual sequential zones usually denominated feed zone, compression and melt zone, metering zone, and mixing zone. The barrel is provided with conventional electric heaters for zoned temperature control and with usual instrumentation. An inlet opening for fluid blowing agent under pressure and feed rate control is provided in the extruder barrel between the metering zone and the mixing zone. The discharge end of the mixing zone of the extruder is connected, through a cooler providing a cooling and temperature control, to a die orifice having generally rectangular configuration.

In practice, polymeric resins in the form of common granules are fed through the feed hopper to the extruder. The temperature in the metering zone is maintained in the range 180°±20° C. Blowing agent is pumped into the inlet between the metering and mixing zones at a predetermined rate under pressure to maintain liquid phase. The mixed mass of molten polymer blend and blowing agent from the mixing zone is cooled in the temperature control zone to a substantially uniform temperature which is just above the temperature at which solid polymer would crystallize out of the gel, which in the case of the ethylenic copolymer blends used in this example is in the range from about 98° C. to about 100° C. in the case of carboxylic acid copolymers and from about 85° C. to about 88° C. in the case of the "non-ionic" copolymers, before passing through the die orifice. The mass emerging from the die orifice to atmospheric pressure expands and forms a cellular foam which is continuously conducted away from the die as the foam forms, cools and hardens to a strip of foamed, cellular, flexible solid resin blend.

In the tests described below in this Example, there is used polymer blends of copolymers listed in Table I. Specific types and ratios of blends of these copolymers are listed in Table II. These blends are mixed in the feed hopper of the extruder with talc as foam nucleation and cell size control agent fed to the hopper at a substantially constant rate as shown in Table II. The blowing agent comprises FC-114 fed to the extruder at a substantially constant rate as shown in Table II.

From the resulting extruded foam products there are cut specimens at about 5 minutes after extrusion. These specimens are cut about 7.5 inches long in the direction of the extrusion and have various thicknesses and widths as shown in Table II. The overall volumes of these specimens are promptly and accurately measured by cubic displacement of water. Their apparent or bulk density is also measured and computed as pounds per cubic foot as recorded in Table II. The volumes of the specimens are measured from time-to-time as hereinbefore described; these volumes, as percentage of the initial 5-minute volume, are recorded in Table III. As shown by the physical properties of these foam products recorded in Table II, all of the foam products of Test Nos. 5 through 14 are soft-textured, substantially closed-cell foams having substantially uniform cells of about from 0.90 to 1.51 mm diameter.

TABLE I

| Polymer Designation | Copolymer Composition | Density (g/cc) | Melting Point (°C.) | Melt Index (dg/min) | Stiffness (psi) |
|---|---|---|---|---|---|
| I | 82% ethylene - 18% vinyl acetate | 0.941 | 85 | 2.5 | 4,500 |
| II | 92% ethylene - 8% acrylic acid | 0.932 | 101 | 5.9 | 14,000 |
| III | 72% ethylene - 28% vinyl acetate | 0.955 | 73 | 6.0 | 1,700 |
| IV | 72% ethylene - 28% vinyl acetate | 0.955 | 73 | 3.0 | 1,700 |

TABLE II

| Test No. | Polymer Type (2) | Polymer Ratio (3) | BA Level (4) | Talc Level (5) | Foam Density Fresh (6) | Foam Density Cured (7) | Foam Width (8) | Foam Thickness (9) | Cell Size (10) | Percent Open Cell (11) | Flex Modulus (12) | Volume Change on Heat Aging (13) |
|---|---|---|---|---|---|---|---|---|---|---|---|---|
| 1* | I | — | 21 | 0.75 | 2.83 | 2.91 | 8.11 | 1.48 | 1.08 | ND | ND | ND |
| 2*(1) | I | — | 22.5 | 0.10 | 2.25 | 2.04 | 7.62 | 1.59 | 1.02 | 10 | 45 | −5.0 |
| 3* | II/I | 20/80 | 32 | 0.25 | Foam Collapsed | | | | | | | |
| 4* | II/I | 30/70 | 29 | 0.68 | Foam Collapsed | | | | | | | |
| 5 | II/I | 40/60 | 29.5 | 0.75 | 2.04 | 1.90 | 7.80 | 1.80 | 1.51 | 43.2 | 46 | +2.3 |
| 6 | II/I | 50/50 | 31 | 0.60 | 2.00 | 2.11 | 8.44 | 1.72 | 1.33 | 22.2 | 42 | −0.8 |
| 7 | II/I | 60/40 | 31 | 0.25 | 1.80 | 1.68 | 8.00 | 1.95 | 1.23 | 7.6 | 45 | +0.1 |
| 8 | II/I | 60/40 | 48 | 0.25 | 1.50 | 1.12 | 7.36 | 1.96 | 1.42 | 10.9 | 27 | −2.1 |
| 9 | II/I | 70/30 | 31.5 | 0.25 | 1.77 | 1.58 | 7.78 | 1.84 | 1.03 | 5.2 | 61 | −2.5 |
| 10 | II/I | 80/20 | 31.5 | 0.25 | 1.79 | 1.58 | 7.72 | 1.85 | 1.00 | 5.4 | 80 | 0.0 |
| 11 | II/I | 90/10 | 31.5 | 0.25 | 1.74 | 1.56 | 7.72 | 1.85 | 1.00 | 5.2 | 86 | −0.8 |
| 12 | II/III | 60/40 | 31.5 | 0.25 | 1.87 | 1.68 | 7.65 | 1.97 | 1.12 | 12.0 | 38 | +0.6 |
| 13 | II/III | 70/30 | 31.5 | 0.25 | 1.85 | 1.59 | 7.42 | 1.81 | 0.92 | 6.5 | 51 | −4.3 |
| 14 | II/IV | 60/40 | 31.5 | 0.25 | 1.88 | 1.73 | 7.67 | 1.84 | 0.90 | 10.8 | 44 | −0.7 |

NOTES
* = Not an example of this invention
ND = Not determined
(1) = Sample prepared by the process described in U.S. Pat. 4,101,467, using a blowing agent mixture of 65 weight percent of FC-114 and 35 weight percent of FC-115
(2) = See Table I
(3) = Weight percent of each copolymer in the blend
(4) = Parts of FC-114 blowing agent mixed in per hundred parts of polymer
(5) = Parts of talc mixed in per hundred parts of polymer
(6) = Density of foam body in pounds per cubic foot measured within about 5 minutes after extrusion
(7) = Density of foam body in pounds per cubic foot measured when it is substantially cured
(8) = Width of foam body in inches
(9) = Thickness of foam body in inches
(10) = Cell size in mm determined per ASTM D-3576
(11) = Amount of open cell in foam structure expressed in volume percent measured per ASTM-2856-A
(12) = Flexural modulus in extrusion direction in pounds per square inch determined by ASTMC-203
(13) = Change in foam volume in percent after aging foam samples at 140° F. for 7 days per U.S. Coast Guard test method 164.015.

TABLE III

Foam Volume Changes in Percent Based on 5-Minute Initial Volume

| Test No. | Polymer Type (2) | Ratio (3) | Minimum Volume (4) | Minimum Time (5) | \multicolumn{8}{c}{Volume Percent After Time in Weeks} |
|---|---|---|---|---|---|---|---|---|---|---|---|---|
| | | | | | 1 | 2 | 3 | 4 | 5 | 6 | 7 | 8 |
| 1* | I | — | 55 | 3 | 56 | 58 | 59 | 67 | 70 | 72 | ND | 78 |
| 2*(1) | I | — | 87 | 1 | 92 | 97 | 97 | 96 | 98 | 98 | ND | 96 |
| 3* | II/I | 20/80 | | | \multicolumn{8}{c}{Foam Collapsed} |
| 4* | II/I | 30/70 | | | \multicolumn{8}{c}{Foam Collapsed} |
| 5 | II/I | 40/60 | 81 | | 88 | 88 | 94 | 93 | 94 | 94 | ND | 93 |
| 6 | II/I | 50/50 | 78 | 2 | 82 | 80 | 86 | 86 | 89 | 88 | ND | 90 |
| 7 | II/I | 60/40 | 87 | 4 | 90 | 90 | 92 | 90 | 91 | 92 | ND | 92 |
| 8 | II/I | 60/40 | 87 | 0.08 | 90 | 94 | 93 | 94 | 92 | 92 | 93 | 93 |
| 9 | II/I | 70/30 | 88 | 0.08 | 93 | 96 | 96 | 97 | 96 | 95 | 96 | 98 |
| 10 | II/I | 80/20 | 92 | 0.08 | 95 | 99 | 99 | 99 | 99 | 98 | 98 | 100 |
| 11 | II/I | 90/10 | 91 | 0.04 | 96 | 99 | 99 | 99 | 98 | 98 | 98 | 99 |
| 12 | II/III | 60/40 | 89 | 0.08 | 96 | 97 | 95 | 96 | 96 | 96 | 97 | 96 |
| 13 | II/III | 70/30 | 91 | 0.04 | 99 | 101 | 98 | 99 | 99 | 99 | 99 | 99 |
| 14 | II/IV | 60/40 | 90 | 0.04 | 92 | 94 | 91 | 94 | 94 | 94 | 94 | 94 |

Notes:
* = Not an example of this invention
(1), (2), (3) = Same as Table II
(4) = Minimum volume of foam body as percentage of initial volume
(5) = Approximate time in days to reach minimum volume expressed as percentage of initial volume.

From the results and data shown in Table II, it will be seen, from Test Nos. 3 and 4, that when the level of ethylene/acrylic acid is lower than about 40 percent by weight in the blend, foam products collapse. As seen from Test Nos. 5 and 6 of Table III, acceptable foam products are obtained when the level of ethylene/acrylic acid copolymer reaches at least 40 percent by weight in the blends. However, these foams contained some open cells. As seen from Test Nos. 7-14 of Table II, when the level of the ethylene/acrylic acid copolymer is at least 60 percent by weight in the blends, foam products are substantially closed cell and of good quality. From the results and data shown in Test Nos. 5-14 of Table III, it can be seen that FC-114 alone can be used as the blowing agent to make dimensionally stable soft foams when suitable copolymer blends are used.

As shown in Table II, at a given foam density, a blend foam is stiffer than that made from ethylene/vinyl acetate copolymer alone. However, lower density blend foams are shown to be more flexible than the foam made from EVA copolymer alone. Also shown in Table II are distinct improvements in heat stability of blend foams: volume loss on heat aging is much less with the blend foams than the control sample made from EVA copolymer alone.

As shown in Test Nos. 5-14 of Table III, all blend foams of this invention have good dimensional stability. This stability becomes better with increasing ethylene/acrylic acid copolymer level in the blends.

In place of all or part of the FC-114 as the blowing agent yielding soft, substantially closed-cell, low density blend foams which are dimensionally stable, there can be used one or more fluorocarbons selected from the group I as described hereinabove with substantially similar results.

In place of the particular ethylene copolymers used to make up the polymer blends in the preceding example, there can be used other low stiffness ethylenic copolymers as hereinbefore described with substantially similar results in obtaining soft, low density, closed-cell blend foams having good dimensional stability.

What is claimed is:

1. A method for making soft ethylenic polymer resin blend foams having substantially closed-cell structure, dimensional stability, and flexural modulus less than about 150 psi which comprises forming under heat and pressure a flowable gel composition of an ethylenic polymer resin blend having low stiffness less than about 20,000 psi of from about 40 to about 90 percent by weight of a copolymer consisting essentially of of ethylene and monoethylenically unsaturated carboxylic acid, containing no salts thereof having from about 3 to about 15 percent by weight of carboxylic acid in admixture with from about 10 to about 60 percent by weight of a copolymer consisting essentially of ethylene and at least one monoethylenically unsaturated non-ionic comonomer having from about 5 to about 45 percent by weight of non-ionic comononer and at least one fluorocarbon blowing agent selected from fluorocarbons having normal boiling point between $-30°$ to $30°$ C., from 2 to 4 carbon atoms in its molecular structure, and a value for the critical quantity $T_b - 0.5 V_c$ of between 110 to 145 where $T_b$ is the normal boiling point temperature of the fluorocarbon in degrees Kelvin and $V_c$ is its critical volume in cubic centimeters per gram-mole, there being up to about 0.35 gram-mole of such blowing agent per 100 grams of resin blend in the flowable gel, and extruding the gel to ambient air atmosphere whereby the blowing agent separates from the gel and forms gas cells in the polymer resin blend.

2. The method according to claim 1 wherein up to 25 parts by weight of the volatile fluorocarbon blowing agent is replaced by at least one volatile blowing agent selected from the group consisting of (a) dichlorodifluoromethane, (b) fluorocarbons having 1 to 4 carbon atoms in their molecular structure, normal boiling point temperature between $-50°$ to $50°$ C. and a value for the critical quantity $T_b - 0.5 V_c$ as defined in claim 1 of between 146 to 190, and (c) hydrocarbons having 3 to 5 carbon atoms in their molecular structure.

3. The method according to claim 2 wherein said fluorocarbons are trichlorofluoromethane, 1-chloro-1,1-difluoroethane, 1,1-difluoroethane and 2,2-difluoropropane and said hydrocarbons are propane, isobutane and neopentane.

4. The method according to claim 1 wherein the carboxylic acid is acrylic acid.

5. The method according to claim 1 wherein the carboxylic acid is methacrylic acid.

6. The method according to claim 1 wherein the non-ionic comonomer is vinyl acetate.

7. The method according to claim 1 wherein the non-ionic comonomer is ethyl acrylate.

8. The method according to claim 1 wherein the copolymer of ethylene and monoethylenically unsaturated carboxylic acid has from about 5 to about 12 percent of carboxylic acid.

9. The method according to claim 1 wherein the copolymer consisting essentially of ethylene and at least one monoethylenically unsaturated non-ionic comonomer has from about 10 to about 45 percent by weight of non-ionic comonomer.

10. The method according to claim 1 wherein the blowing agent is 1,2-dichlorotetrafluoroethane, 1-chloro-1,2,2,2-tetrafluoroethane or 2,2-difluoropropane.

11. The method according to claim 1 wherein the starting ethylenic polymer blend comprises a copolymer of ethylene and acrylic acid having from about 5 to about 12 percent by weight of acrylic acid, and a copolymer of ethylene and vinyl acetate having from about 15 to about 30 percent by weight of vinyl acetate.

12. The method according to claim 11 wherein the blowing agent is 1,2-dichlorotetrafluoroethane, 1-chloro-1,2,2,2-tetrafluoroethane or 2,2-difluoropropane.

13. As an article of manufacture, a soft ethylenic polymer blend foam having substantially closed-cell structure, dimensional stability, and flexural modulus less than 150 psi, wherein said blend comprises a copolymer consisting essentially of of ethylene and monoethylenically unsaturated carboxylic acid, containing no salts thereof, having from about 3 to about 15 percent by weight of carboxylic acid and a copolymer consisting essentially of ethylene and at least one monoethylenically unsaturated non-ionic comonomer having from about 5 to about 45 percent by weight of non-ionic comonomer, said blend having stiffness less than 20,000 psi, said foam having density from about 1.0 to about 6 pounds per cubic foot and further characterized in that the gas space of said foam cells originally comprises as an essential constituent a volatile fluorocarbon selected from fluorocarbons having normal boiling point between $-30°$ to $30°$ C., from 2 to 4 carbon atoms in its molecular structure, and a value for the critical quantity $T_b - 0.5V_c$ of between 110 to 145 where $T_b$ is the normal boiling point temperature of the fluorocarbon in degrees Kelvin and $V_c$ is its critical volume in cubic centimeters per gram-mole, there being up to about 0.35 gram-mole of such blowing agent per 100 grams of resin blend in the flowable gel.

14. An article of manufacture according to claim 13 wherein said fluorocarbons are 1,2-dichlorotetrafluoroethane, 1-chloro-1,2,2,2-tetrafluoroethane, 1-chloro-1,1,2,2-tetrafluoroethane and 1,1,1-trifluoropropane.

15. An article of manufacture according to claim 13 wherein up to 25 parts by weight of the volatile material is replaced by at least one volatile material selected from the group consisting of (a) dichlorodifluoromethane, (b) fluorocarbons having 1 to 4 carbon atoms in their molecular structure, normal boiling point temperature between $-50°$ to $50°$ C. and a value for the critical quantity $T_b - 0.5V_c$ as defined in claim 1 of between 146 to 190, and (c) hydrocarbons having 3 to 5 carbon atoms in their molecular structure.

16. An article of manufacture according to claim 15 wherein said fluorocarbons are trichlorofluoromethane, 1-chloro-1,1-difluoroethane, 1,1-difluoroethane and 2,2-difluoropropane and said hydrocarbons are propane, isobutane and neopentane.

17. An article of manufacture according to claim 12 wherein said ethylenic polymer blend foam has density from about 1.0 to about 3 pounds per cubic foot, and the polymer blend comprises a copolymer of ethylene and acrylic acid having from about 5 to about 12 percent by weight of acrylic acid and a copolymer of ethylene and vinyl acetate having from about 15 to about 30 percent by weight of vinyl acetate, which polymer blend has stiffness less than about 10,000 psi.

18. An article of manufacture according to claim 13 wherein said gas space of said foam cells ultimately comprises as an essential constituent air.

* * * * *

UNITED STATES PATENT AND TRADEMARK OFFICE
CERTIFICATE OF CORRECTION

PATENT NO. : 4,215,202

DATED : July 29, 1980

INVENTOR(S) : Chung P. Park

It is certified that error appears in the above-identified patent and that said Letters Patent are hereby corrected as shown below:

Column 6, line 66, "olymer" should read -- polymer --;

Column 10, Table II, the last three columns of Test No. 6, "22.242", "-0.8", and "  " should read -- 22.2 --, -- 42 --, and -- -0.8 --, respectively;

Column 11, Table III, under "Minimum Time (5)" column heading, Test No. 5 should read -- 1 --.

Signed and Sealed this

Sixteenth Day of December 1980

[SEAL]

Attest:

SIDNEY A. DIAMOND

Attesting Officer

Commissioner of Patents and Trademarks